US006191927B1

(12) United States Patent
Bock et al.

(10) Patent No.: US 6,191,927 B1
(45) Date of Patent: Feb. 20, 2001

(54) SURGE PROTECTOR

(75) Inventors: Larry E. Bock, Glens Falls; John B. Cozzens, Jr., Queensbury, both of NY (US)

(73) Assignee: General Electric Company, Schenectady, NY (US)

( * ) Notice: Under 35 U.S.C. 154(b), the term of this patent shall be extended for 0 days.

(21) Appl. No.: 09/244,636

(22) Filed: Feb. 4, 1999

(51) Int. Cl.[7] .......... H02H 1/00
(52) U.S. Cl. .......... 361/127; 361/118
(58) Field of Search .......... 361/106, 111, 361/117, 118, 119, 124, 126, 127, 56; 29/592.1, 610.1, 613, 614, 619, 621, 854, 855, 876, 884

(56) References Cited

U.S. PATENT DOCUMENTS

| | | | | |
|---|---|---|---|---|
| 4,077,439 | * | 3/1978 | Hamuro et al. | 29/33 F |
| 4,809,124 | | 2/1989 | Kresge | 361/58 |
| 5,068,637 | * | 11/1991 | Bayer | 338/57 |
| 5,191,503 | | 3/1993 | Kawamura et al. | 361/127 |
| 5,220,480 | | 6/1993 | Kershaw, Jr. et al. | 361/137 |
| 5,272,588 | | 12/1993 | Motoori | 361/119 |
| 5,402,100 | | 3/1995 | Urbanek et al. | 338/21 |
| 5,608,596 | | 3/1997 | Smith et al. | 361/118 |
| 5,632,079 | * | 5/1997 | Morant | 29/619 |
| 5,724,221 | * | 3/1998 | Law | 361/127 |

* cited by examiner

*Primary Examiner*—Ronald W. Leja
(74) *Attorney, Agent, or Firm*—Thomas M. Blasey; Carl B. Horton; Hunton & Williams

(57) ABSTRACT

A surge suppressor and method for its manufacture. The surge suppressor includes a housing, a plurality of terminal busses contained within the housing, and a plurality of substantially planar conductive plates, each plate having two electrodes for electrical connection to two of the plurality of terminal busses. In one embodiment, by using five terminal busses pentagonally arranged around the plates, the surge protector requires only two types of plate/electrode configurations, thereby simplifying manufacture.

32 Claims, 6 Drawing Sheets

SURGE PROTECTOR

BACKGROUND OF THE INVENTION

The present invention relates to surge protection in a power distribution system. More particularly, the present invention relates to a surge protector which is economical, reliable, and flexible, and a method for making the same.

Electrical components can be severely damaged by electrical surges, and there are many types of surge suppressors which have been designed to address this problem. One example of a known surge suppressor is disclosed in U.S. Pat. No. 4,809,124 as a high energy, low voltage surge arrestor. The surge arrestor of the '124 patent discloses an embodiment which includes a thin disk of metal oxide varistor (MOV) material having a circular periphery and opposite planar external surfaces. The planar external surfaces are coated with a highly conductive material, and two electrodes are brazed or clamped to the metallized external surfaces, the clamped arranged being preferred when very high currents are anticipated. Each electrode is in the form of a generally circular flat plate with two terminal lugs projecting radially from the electrode body on diametrically-opposed sides of the electrode body. The electrode disclosed in the '124 patent is suitable for use in the circuit shown in FIG. 4 thereof, where two spaced-apart conductors interconnect a source and a load, one conductor connecting an upper terminal of the source to an upper terminal of the load, and the other conductor connecting a lower terminal of the load to a lower terminal of the source. The surge arrester disclosed in the '124 patent is, in effect, connected across the first and second conductors in parallel with the load.

FIG. 1 is an example of using surge protectors to provide multiple "modes of protection" in an electrical distribution system having three phases A, B, and C, a neutral N and a ground G. In FIG. 1, surge protection is provided between the neutral N and each of phases A, B, and C, as well as ground G. Thus, in this embodiment, four modes of protection are provided. Additional modes of protection may be desirable and achievable. For example, seven modes of protection can be achieved by providing surge protection between the neutral N and each of phases A, B and C, between ground G and each of phases A, B and C, and between neutral N and ground G as shown in FIG. 5. Additional modes of protection can be achieved by providing surge protection between each of the phases A, B, and C.

The surge arrester of the '124 patent, and other known surge arresters, suffer from numerous drawbacks. First, they can be expensive to produce and assemble because they are typically housed in a housing using numerous machined textolite pieces. Second, the devices are not readily adaptable to provide more than four modes of protection, because the interconnections required to achieve additional modes of protection are not easily and reliably made. Third, the heat transfer characteristics of conventional surge protectors (that is, their ability to dissipate heat following a surge event) are insufficient and make it difficult to reduce size and cost.

Fourth, connections within the surge protectors are typically cumbersome, adding inductance and increasing the transient voltage during a surge event. It would be desirable to provide a low cost, relatively small surge protector with reliable connections. Such a surge protector should also provide flexibility to accommodate different connection options and different modes of protection. It would further be desirable for such a surge protector to be adaptable to allow modifications to reduce cost for light duty applications, or to allow modifications to increase the surge rating for heavier duty applications with minor changes. It would also be desirable for a surge protector to have improved heat transfer characteristics.

It would also be desirable to minimize the interconnection lead lengths, thereby reducing the surge impedance and induced voltages during transient events. Known surge protectors do not provide these and other desirable features.

SUMMARY OF THE INVENTION

The present invention overcomes the above-described problems, and achieves other advantages by providing for an improved surge protector and method for making the same. In the exemplary embodiments described below, a surge protector according to the invention includes a housing, a plurality of terminal busses contained within the housing, and a plurality of substantially planar MOV/conductive plate assemblies, each assembly having two electrodes for electrical connection to two of the plurality of terminal busses. The plates are preferably stacked, and there are preferably five terminal busses arranged pentagonally around the stacked conductive plates.

In addition to providing the desired features not provided by the prior art, as described above, the surge protector of the present invention requires only two types of plate/electrode configurations, thereby simplifying manufacture.

BRIEF DESCRIPTION OF THE DRAWINGS

The present invention can be more fully understood by reading the following Detailed Description of Preferred Embodiments in conjunction with the accompanying drawings, in which.

DETAILED DESCRIPTION OF PREFERRED EMBODIMENTS

Figure 2:
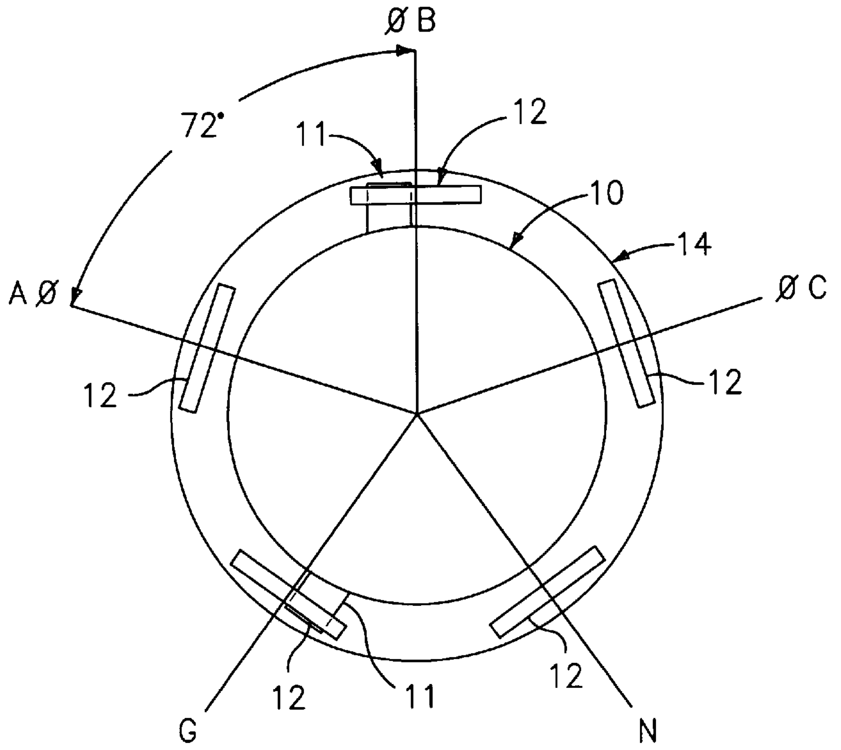
FIG. 2 is a cross-sectional view of a surge protector according to one embodiment of the present invention.

Referring now to FIG. 2, a cross-sectional view of a surge protector according to an embodiment of the present invention is shown. The surge protector of FIG. 2 includes at least one generally circular plate or disk 10 shown as having two electrodes 11 electrically and mechanically joined to disk 10 by a process such as soldering. It will of course be appreciated that the plate can have a variety of other suitable shapes. The electrodes 11 of the disk 10 are connected to two of a plurality of terminal busses 12. In this example, there are five terminal busses 12 evenly distributed around the centrally-located disk 10. In other words, the busses are arranged generally pentagonally, where each bus is spaced approximately 72° apart relative to its neighboring busses. It should be appreciated that while the cross-sectional view of FIG. 2 shows a single disk connected to two particular terminals, a surge protector would typically include multiple disks which may be connected to different terminal busses than those shown in FIG. 2. If desired for increased duty ratings, multiple disks could be connected to the same pairs of terminal busses. As will be described in more detail below, the assembly can be potted with an insulating material such as urethane to enhance heat transfer and to provide solid electrical insulation between potentials within the device. This aspect of the present invention allows the parts to be closely spaced, thereby allowing the size of the device to be significantly reduced. In known surge protectors, the housing typically represents a substantial portion of the cost of producing the surge protector. Because the surge protector of the present invention, by virtue of its arrangement of components and heat transfer enhancements, allows the size of the device (and thus the housing) to be reduced, the present invention allows substantial cost savings to be achieved.

Figure 3:
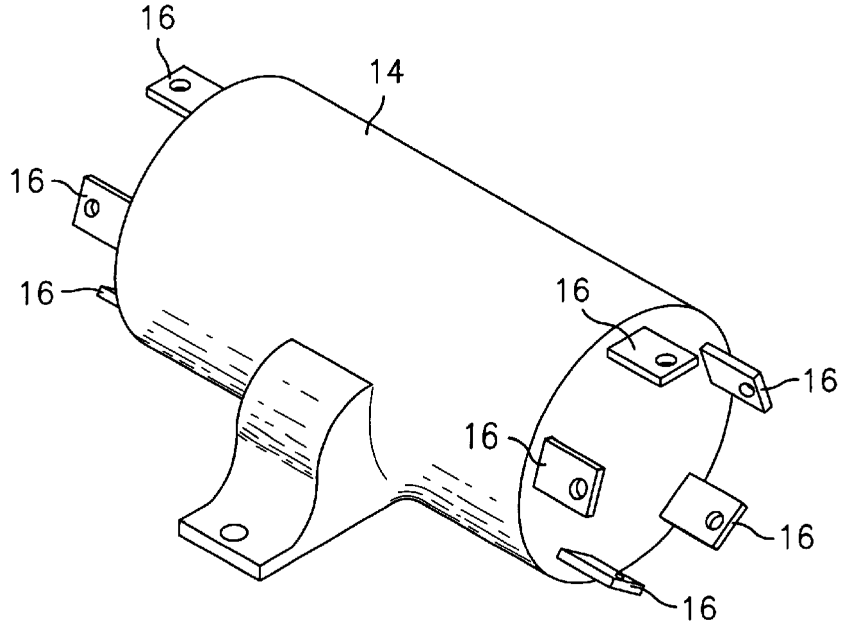
FIG. 3 is a diagram of the surge protector of FIG. 2, when embodied in a housing.

Referring now to FIG. 3, a completed surge protector embodied in a housing 14 with external connections 16. The external connections 16 are the terminal busses 12. While the embodiment of FIG. 3 is shown as having external connections 16 at both ends of the unit, it should be understood that the surge protector can alternatively be embodied in a housing such that external connections are provided to one end only. This alternative embodiment would be appropriate for connection of the surge protector in parallel to an electrical distribution line, while the embodiment of FIG. 3 (external connections at both ends of the surge protector) would be appropriate for connection of the surge protector in series with an electrical distribution line.

Figure 4:
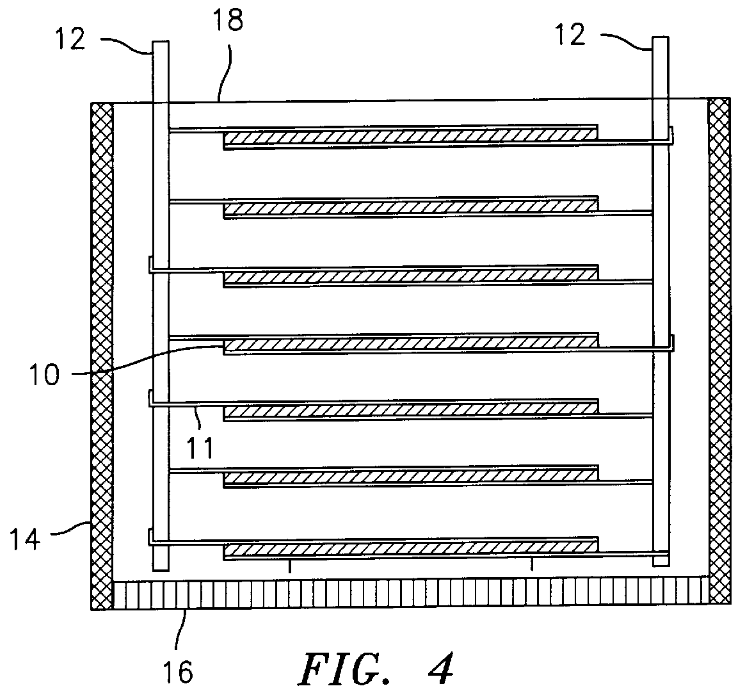
FIG. 4 is a side view diagram of the surge protector of FIG. 2.

Referring now to FIG. 4, a side view of a surge protector is shown. This view shows two terminal busses 12 (of the five terminal busses shown in FIG. 2) and seven disks 10. It can be seen in FIG. 4 that certain ones of the seven disks 10 are connected to the terminal busses 12 by way of electrodes 11, which cooperate with, e.g., slots of the terminal busses 12. The disks and terminal busses are housed within housing 14, which in this example is a tube having an end element 16. The housing is filled to a level 18 with a suitable insulative potting material such as urethane. By coating the disks and terminal busses with the insulative potting material, heat transfer is enhanced while electrical insulation is provided. This allows the parts to be closely spread, thus reducing the size of the surge suppressor. An alternate embodiment is to fill the protector with sand, which will provide good heat transfer but may require larger spacings for electrical clearances. In a preferred implementation, the electrodes 11 are soldered to the terminal busses 12 to provide a reliable connection. The soldering of electrodes 11 to slotted terminal busses 12 results in greatly improved reliability over conventional surge protectors, where wire leads are typically used to connect MOV disks with terminals. As will be appreciated by those skilled in the art, the use of long interconnecting leads introduces lead inductances, which results in a non-negligible impedance to rapidly-rising current surges and can result in very large voltage drops across the leads and across the device being protected. U.S. Pat. No. 4,809,124, for example, has attempted to minimize lead length, but cannot provide the extremely short connection between the electrodes and the terminals as achieved in this invention, to avoid the lead inductance problem.

Figure 1:
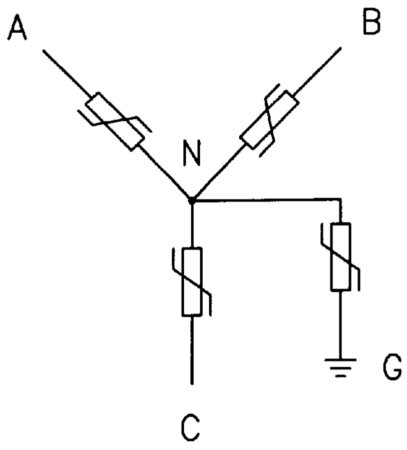
FIG. 1 is a diagram showing four modes of surge protection in a three-phase electrical distribution system.
Figure 5:
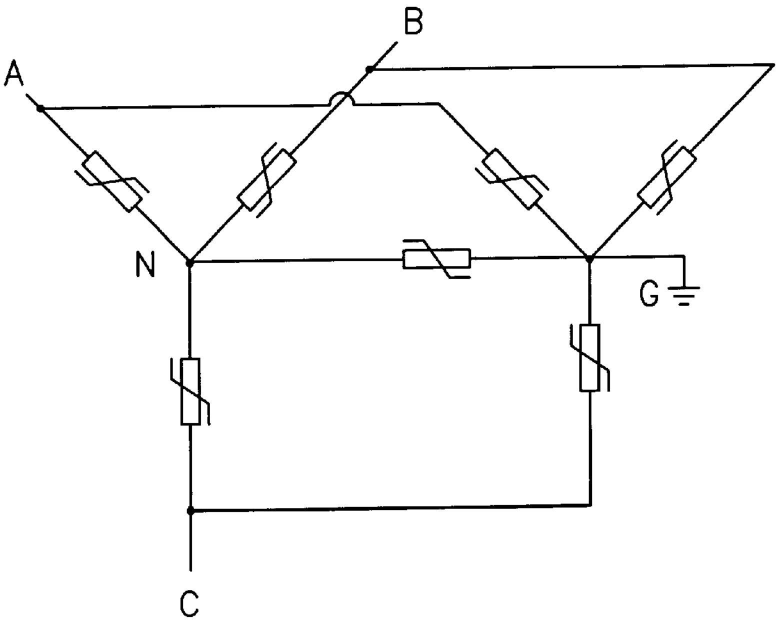
FIG. 5 is a diagram showing seven modes of protection in a three-phase electrical distribution system.

The seven-disk example shown in FIG. 4 allows the surge protector to provide seven modes of protection. In other words, each of the seven disks can be connected between a unique pair of the five terminals, as shown in FIG. 5. More disks can provide a higher level of protection (e.g., 10 mode protection, where each of 10 disks can be connected between each possible unique combination of pairs of the five terminals). Thus, it should be appreciated that the structure of the surge protector of the present invention provides flexibility, and is readily adaptable to providing varying levels of surge protection.

Figure 6:
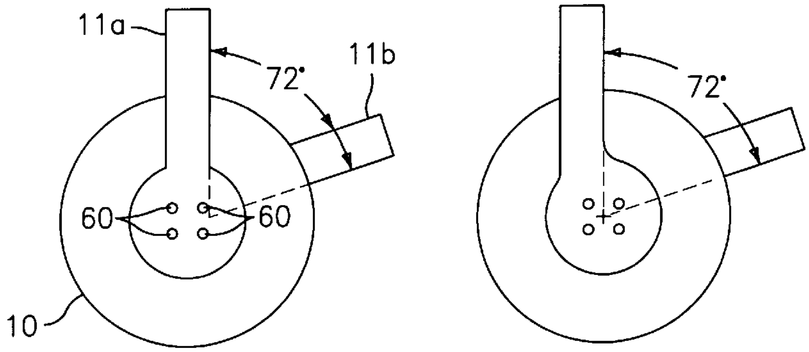
FIGS. 6–7 are diagrams of first and second plate/electrode assemblies, respectively, for use with the surge protector of FIG. 2.
Figure 7:
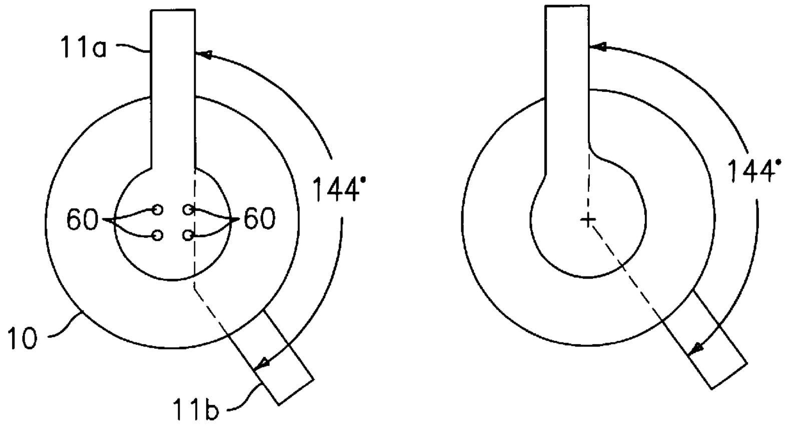

Referring now to FIGS. 6 and 7, diagrams of first and second plate/electrode assemblies, respectively, are shown. Each plate/electrode assembly includes a top electrode 11*a* which can be attached to a first surface of the plate/disk 10 by solder joints 60 or other suitable attachment means, and a bottom electrode 11*b* which can be attached to a second (opposite) surface of the plate/disk 10 in a similar manner. In the first plate/electrode assembly shown in FIG. 6, the electrodes 11*a* and 11*b* extend outwardly from the center of the plate/disk 10 approximately 72° apart, and in the second plate/electrode assembly shown in FIG. 7, the electrodes 11*a* and 11*b* extend outwardly from the center of the plate/disk 10 approximately 144° apart. These separation angles correspond to the angles of the pentagonal arrangement of terminal busses shown in FIG. 2. It should therefore be appreciated that the plate/electrode configurations shown in FIGS. 6–7 are the only two configurations necessary for use with the pentagonal arrangement of FIG. 2, since any pair of pentagonally-arranged electrodes can be connected using one of the two assemblies shown in FIGS. 6–7. By requiring only two different surge protection disk assemblies, the surge protector of FIG. 2 advantageously simplifies the manufacturing process.

Figure 8:
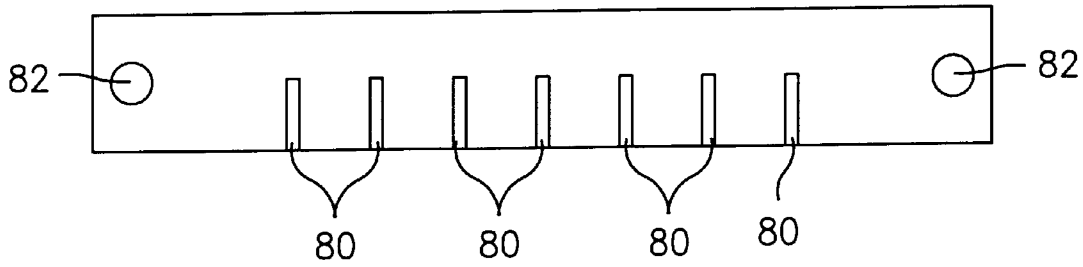
FIG. 8 is a diagram of a terminal bus suitable for use in the surge protector of FIG. 2.

Referring now to FIG. 8, a diagram of a terminal bus 12 suitable for use in the surge protector of FIG. 2 is shown. The terminal bus 12 is preferably a substantially rectangular, substantially planar conductive metal plate having a plurality of slots 80 for cooperation with the electrodes 11 of the plates 10. The terminal bus 12 of FIG. 6 further includes holes or other suitable connection point 82 at each end for external connections. It will be appreciated that, consistent with the description earlier, for parallel connections only one end of the terminal bus 12 will be connected to a circuit. Accordingly, for such an application one of the holes 82 can be omitted. It should also be appreciated that the slots 80 could alternatively be replaced by holes or other suitable connection points should it be desirable, for example, to connect plates and terminals using conventional wire leads. The slots 80 and extended portions of the electrodes 11 could alternatively be replaced by, for example, a plug-in connection on the terminal bus 12 which cooperates with a plug-in portion of an electrode.

Figure 9:
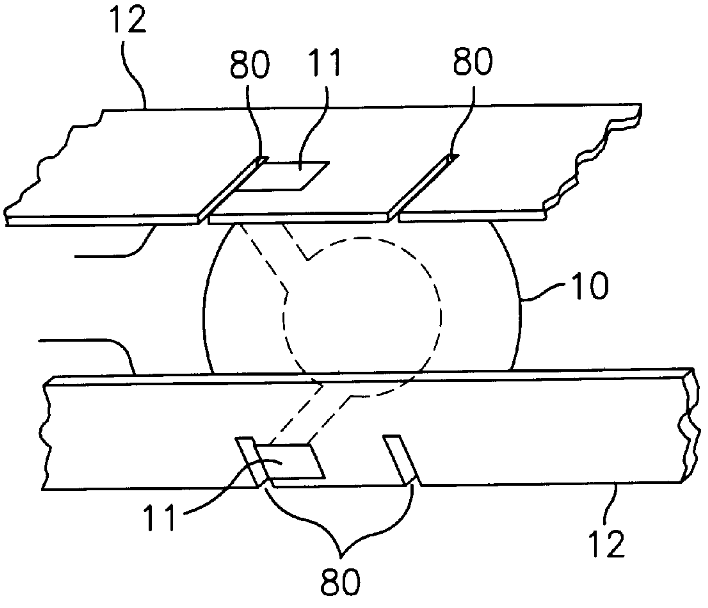
FIG. 9 is a diagram showing in more detail the connection between a single plate/electrode assembly and two terminal busses.

Referring now to FIG. 9, a more detailed view of the manner in which the electrodes 11 of the plates 10 can be connected to the terminal bus 12. As shown, the connection is made by inserting an extended portion of the electrodes 11 of a plate 10 into the slots 80 of two different terminal busses 12. The electrodes 11 thus extend through the slots 80 and can be bent to establish a physical connection, and soldered to provide a reliable electrical connection.

Figure 10:
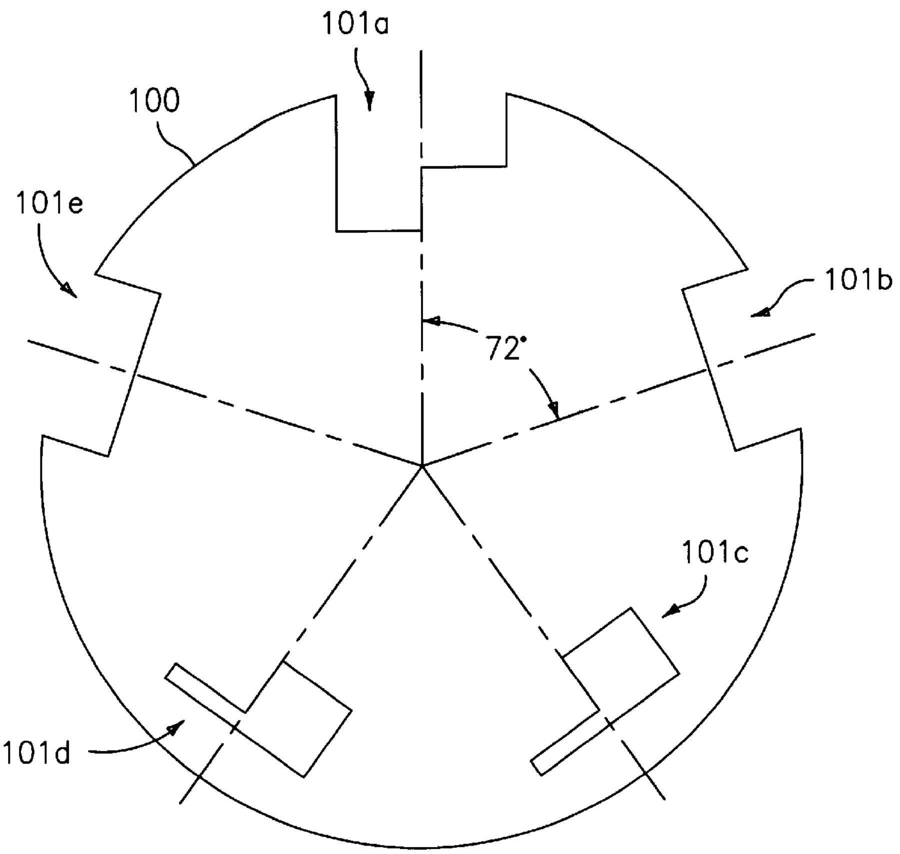
FIGS. 10–12 are diagrams of an end assembly plate, location bar, and assembly arrangement, respectively, for assembling a surge protector.
Figure 11:
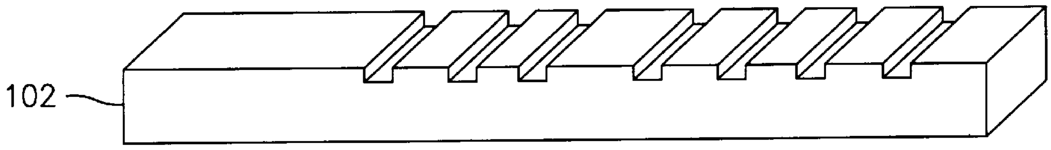
Figure 12:
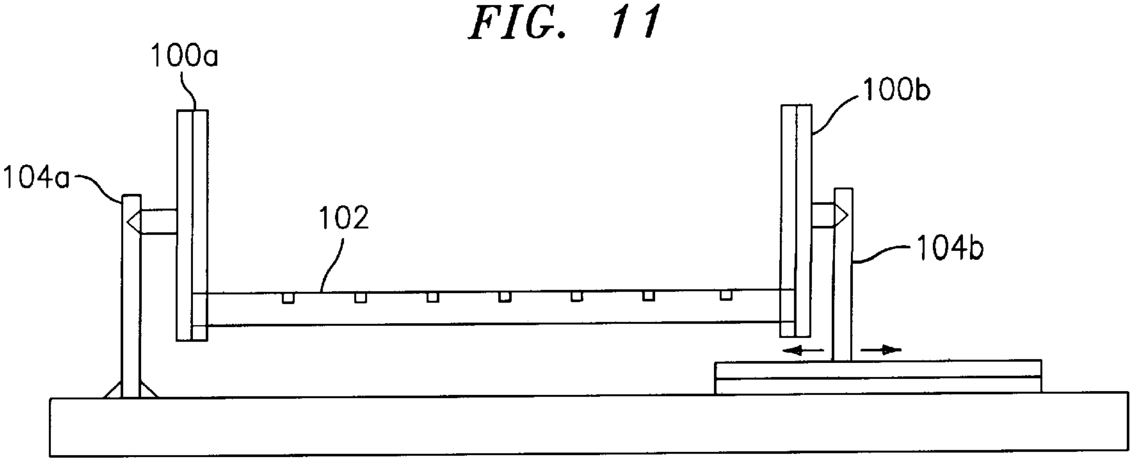

Referring now to FIGS. 10–12, components useful for the assembly of the surge protector of the present invention are shown. More particularly, FIG. 10 is a planar view of an exemplary fixture plate 100 useful for physically aligning the disks 10 and the terminal busses 12 during assembly, in a manner which will be described in more detail below. The fixture element 100 is shown as an end fixture plate, which can be made of, for example, metal, and which includes variously-configured openings 101_a–e_. FIG. 11 shows an example of a fixture element or disk locator bar 102. The disk locator bar 102, along with a terminal bus 12, can be fitted into one of two openings 101_a_, 101_b_ of each of two fixture elements 100, such that the fixture elements 100 maintain the bar 102 and the terminal bus 12 in a substantially fixed position between the elements 100. FIG. 12 shows an exemplary assembly arrangement for assembling a surge suppressor according to the present invention. The assembly arrangement as shown includes end elements 104_a_, 104_b_, fixture plates 100_a_, 100_b_ rotatably mounted to the end elements 104_a_, 104_b_, respectively, and a disk locator bar 102. Preferably, one of the end elements is fixed, while the other end element is adjustable, thereby allowing the disk locator bars and terminal busses to be inserted between the fixture plates, and allowing the fixture plates to be brought closer together to hold the bars and busses in place. According to an exemplary method for assembling a surge suppressor, two terminal busses and two disk locator bars are fitted into the openings 101 of the fixture elements, and the fixture plates 100_a_, 100_b_ are arranged to hold the terminal busses and disk locator bars in place. Next, conductive plates 10 are aligned at appropriate positions on the two disk locator bars. As shown in FIG. 12, the plates 10 can be set in the slots of the disk locator bars 102. Each disk is preferably oriented such that its electrodes are in a proper, predetermined alignment position relative to the terminal bus locations, and for plates whose electrodes are to be connected to the terminal busses already in place in the assembly arrangement shown in FIG. 12, the electrodes of those plates are fitted into the slots of the corresponding slotted terminal busses. After all plates are placed and appropriately aligned, a third disk locator bar (not shown in FIG. 12) is added at a third opening 101_d_ of the fixture plates, with the slots of the locator bar engaging the plates 10. Terminal busses 12 are then fitted between between each of openings 101_c_, 101_d_, and 101_e_, with the electrodes engaging the corresponding slots on the appropriate terminal busses. A temporary holding band (not shown) can be provided to firmly and properly position the components.

At this stage, the electrodes are soldered to the terminal busses, for example, for a first terminal bus by bending the electrode portions extending through the slots of the first terminal bus and soldering the bent electrode to the terminal bus. The assembly is then rotated by rotating the rotatably-mounted fixture plate 100_a_, 100_b_, and soldering is performed for the electrodes extending through the slots of a second terminal bus. This process is repeated until all necessary connections are made. The assembly is then removed from the fixture plates by removing the temporary holding band, sliding the adjustable end element 104_b_ away from the fixed end element 84_a_, and sliding each disk alignment bar 102 out of the assembly.

To complete the method of manufacturing the surge suppressor, the removed assembly is placed into a tube having one end closed, an insulative potting material such as urethane is added to substantially fill the tube, and the second end of the tube is closed.

It should be appreciated that the method of assembly described above has assumed that certain details—for example, that the surge suppressor includes five terminal busses which are slotted, that the electrodes are attached to the terminal busses 12 by soldering, and that the assembly fixture equipment is as shown in FIGS. 10–12. These and other details of the method can of course be modified, as there are any number of suitable fixture designs which can be used to achieve the same finished surge suppressor, and which will achieve the same objective of maintaining the physical alignment of the plates and terminal busses during assembly.

Figure 13:
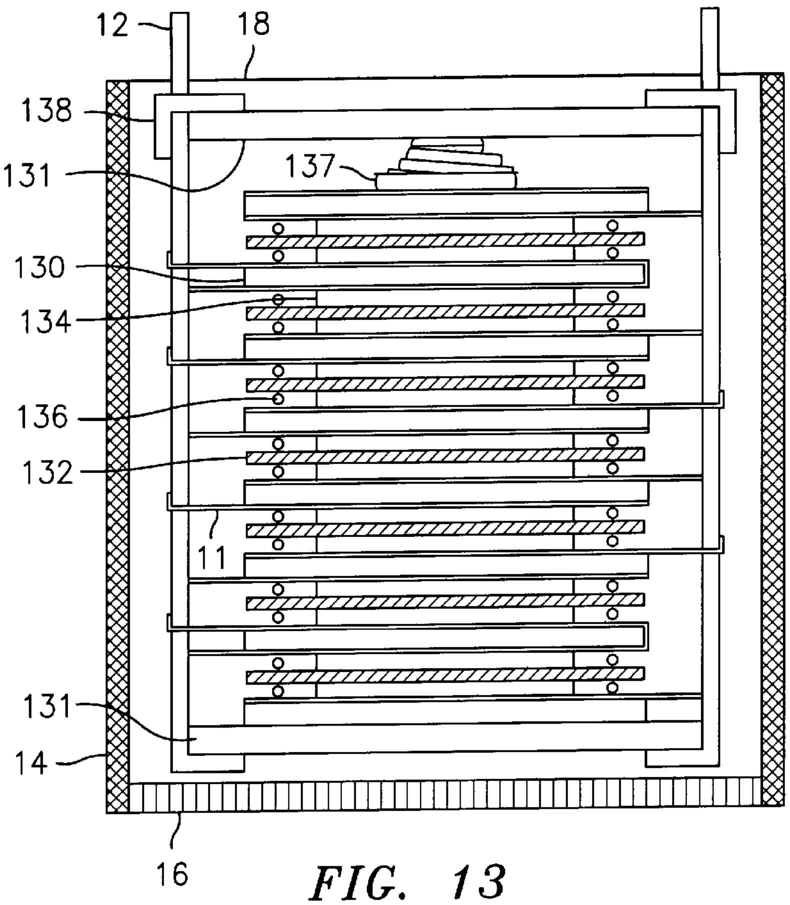
FIG. 13 is a side view diagram of an alternate embodiment of the surge protector of FIG. 4.

The above descriptions of the surge suppressor and method of its manufacture assume other details, such as that the plates 10 include electrodes 11 which are soldered to the plates. It should be appreciated that other suitable plate/electrode arrangements can be used. For example, FIG. 13 shows an arrangement of an alternate completed surge suppressor assembly, which externally and functionally is essentially the same as the embodiment described above. However, instead of soldering the electrodes to the plates, mechanical spring compression is used to connect the electrodes 11 to the plates 10.

Figure 14:
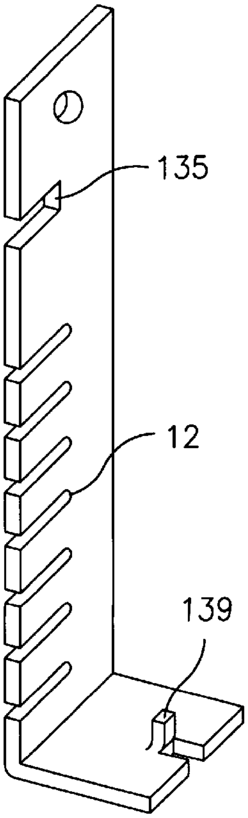
FIG. 14 is a diagram of a terminal bus in the surge protector of FIG. 13.
Figure 15:
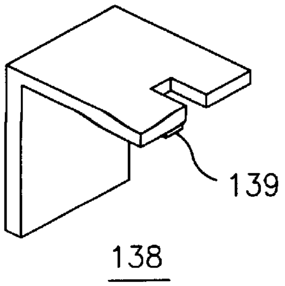
FIG. 15 is a restraining clip in the surge protector of FIG. 13.

The surge suppressor according to this embodiment can be assembled by stacking, as shown in FIG. 13, textolite pieces 130, disks 132, metal spacers 134, O-rings 136, and spring 137 in a tube having one end closed. Once the stack is in place, and the electrodes are properly positioned, the stack is compressed and the terminal busses 12 are fitted onto the appropriate electrodes 11 such that the electrodes 11 extend through the slots of the appropriate terminal bus 12. Restraining clips 138 (FIG. 15) are provided, which slide into restraining clip slots 135 (FIG. 14) on appropriate terminal busses, and which are provided with a nub 139 to interlock with a hole (not shown) in the end textolite piece 131. Likewise, each terminal bus is provided with a similar nub 139 (see FIG. 14) to interlock with a hole (not shown) in the other end textolite piece 131. O-rings 136 function to prevent the potting material from getting between the electrical contact surfaces, and the metal spacers 134 function to assure proper compression of the O-rings 136. After the electrodes are soldered to the terminal busses, the assembly is placed in a tube and potted in a similar manner as described with respect to the earlier embodiments.

Exemplary materials and dimensions for the embodiment shown in FIG. 13 using disks of approximately 3" diameter are as follows. The restraining clips 138 are also made of tinned copper, and are approximately 0.06" thick. The textolite end pieces 131 are approximately 0.25" thick and are approximately 3.75" in diameter, the textolite spacers 130 are approximately 0.12" thick and approximately 3" in diameter. The metal spacers 134 are preferably made of aluminum, are approximately 0.06" thick and 2" in diameter.

For all the embodiments described herein, the terminal busses are made of tinned copper, and are approximately 0.06" thick and 1" wide. The electrodes are made of copper, approximately 0.02" thick. The disks or plates vary in thickness between about 0.055" and about 0.25", and are approximately 3" in diameter. The housing or tube is made of plastic, approximately 0.06" thick, and with an outside diameter of approximately 4.12". The plastic end plug is approximately 0.12" thick and has a diameter of approximately 3.88".

It of course will be appreciated that these materials and dimensions are presented to provide the reader with one appropriate size for a surge suppressor according to the present invention, and that the materials and dimensions can be varied widely.

The surge protector according to the present invention provides a high degree of flexibility, as the surge protector can be made as a lighter duty device with fewer and smaller diameter disks, or a still-lighter duty device by using conventional MOV disks with wire leads for connection to the terminal busses. Of course, the surge protector of the present invention can also be made as a heavier duty device with more and larger diameter disks.

It should be appreciated from the foregoing description that as a result of the selection, arrangement and assembly of its component parts, the surge protector of the present invention can be a low cost, small size, reliable device. The surge protector minimizes lead inductance problems, provides improved heat transfer, and is flexible to provide, among other options, 7 and 10 mode protection, series or parallel connections, as well as light duty protection. These and numerous other advantages over known surge protectors are provided by the present invention.

While the description above includes many details and specifics, it is to be understood that these are provided solely for purposes of explanation. The details above do not limit the scope of the invention, which is defined by the following claims and their legal equivalents.

What is claimed is:

1. An apparatus for suppressing surges in a power distribution system, comprising:

a housing;

a plurality of terminal busses contained within the housing; and a plurality of substantially planar conductive plates, each plate having two electrodes for electrical connection to two of the plurality of terminal busses, wherein said plurality of substantially planar conductive plates includes a first number of substantially planar conductive plates and a remaining number of substantially planar conductive plates, wherein said first number of substantially planar conductive plates have a first electrode configuration, where a first angle is defined by the two electrodes and a center of the plate, and wherein said remaining number of substantially planar conductive plates have a second electrode configuration, where a second angle is defined by the two electrodes and the center of the plate.

2. The apparatus of claim 1, further comprising an electrical insulation material contained within the housing to electrically insulate the plurality of conductive plates from one another.

3. The apparatus of claim 2, wherein the insulation material is urethane.

4. The apparatus of claim 2, wherein the insulation material is sand.

5. The apparatus of claim 1, where there are five terminal busses, each terminal bus corresponding to one of a first phase, a second phase, a third phase, a neutral, and a ground.

6. The apparatus of claim 5, wherein the five terminal busses are arranged substantially pentagonally around the plurality of conductive plates.

7. The apparatus of claim 1, wherein the conductive plates include metal oxide varistor disks.

8. The apparatus of claim 7, wherein the disks are substantially circular.

9. The apparatus of claim 1, wherein the terminal busses are slotted, and the electrodes are connected to the busses through the slots.

10. The apparatus of claim 1, wherein the terminal busses include a plurality of holes, and the electrodes are connected to the busses through the holes.

11. The apparatus of claim 1, wherein the electrodes are connected to the busses by soldering.

12. The apparatus of claim 1, wherein the electrodes are connected to the conductive plates by a spring compression assembly.

13. A method for assembling a surge protection device, comprising the steps of:

physically aligning a plurality of electrically conductive plates including a first number of substantially planar conductive plates and a remaining number of substantially planar conductive plates, wherein said first number of substantially planar conductive plates has a first electrode configuration, where a first angle is defined by the two electrodes and a center of the plate, and wherein said remaining number of substantially planar conductive plates has a second electrode configuration, where a second angle is defined by the two electrodes and the center of the plate, with a plurality of terminal busses such that the electrodes are in predetermined alignment positions with respect to two of the terminal busses;

soldering the electrodes to the corresponding terminal busses while maintaining the physical alignment of the plates and the terminal busses;

placing the soldered assembly into a housing; and substantially filling the housing with an insulating potting material.

14. The method of claim 13, wherein the step of physically aligning is performed by the steps of:

fitting at least two terminal busses and at least two alignment bars into two fixture elements, the two fixture elements maintaining the terminal busses and alignment bars in a substantially fixed position therebetween;

fitting the plurality of electrically conductive plates into a corresponding plurality of slots on the at least two alignment bars;

fitting at least one additional alignment bar into the two fixture elements, the at least one additional alignment bar having slots which engage the plurality of electrically conductive plates;

fitting at least one additional terminal bus into the two fixture elements such that the at least one additional terminal bus is in the predetermined alignment position with respect to the electrodes.

15. The method of claim 14, wherein the fixture elements are rotatable, and wherein the step of soldering is performed by soldering the electrodes corresponding to one terminal bus and rotating the assembly to solder additional electrodes.

16. The method of claim 13, wherein the step of physically aligning is performed by fitting the plurality of electrodes into corresponding slots on the plurality of terminal busses, and wherein the step of soldering is performed by bending portions of the electrode extending through the corresponding slots and soldering the electrodes in place.

17. An apparatus for suppressing surges in a power distribution system, comprising:

a housing;

a plurality of slotted terminal busses contained within the housing, wherein each of said slotted terminal busses includes at least two slots; and a plurality of substantially planar conductive plates, each plate having two electrodes for electrical connection to two of the plurality of terminal busses through the slots.

18. The apparatus of claim 17, wherein each conductive plate has one of a first electrode configuration, where a first angle is defined by the two electrodes and a center of the plate, and a second electrode configuration, where a second angle is defined by the two electrodes and the center of the plate.

19. The apparatus of claim 17, further comprising an electrical insulation material contained within the housing to electrically insulate the plurality of conductive plates from one another.

20. The apparatus of claim 19, wherein the insulation material is urethane.

21. The apparatus of claim 19, wherein the insulation material is sand.

22. The apparatus of claim 17, where there are five terminal busses, each terminal bus corresponding to one of a first phase, a second phase, a third phase, a neutral, and a ground.

23. The apparatus of claim 22, wherein the five terminal busses are arranged substantially pentagonally around the plurality of conductive plates.

24. The apparatus of claim 17, wherein the conductive plates include metal oxide varistor disks.

25. The apparatus of claim 24, wherein the disks are substantially circular.

26. The apparatus of claim 17, wherein the slots comprise a plurality of holes, and the electrodes are connected to the busses through the holes.

27. The apparatus of claim 17, wherein the electrodes are connected to the busses by soldering.

28. The apparatus of claim 17, wherein the electrodes are connected to the conductive plates by a spring compression assembly.

29. A method for assembling a surge protection device, comprising the steps of:

physically aligning a plurality of electrically conductive plates with a plurality of slotted terminal busses such that the electrodes are in predetermined alignment positions with respect to two of the terminal busses;

soldering the electrodes to the corresponding slotted terminal busses while maintaining the physical alignment of the plates and the terminal busses;

placing the soldered assembly into a housing; and substantially filling the housing with an insulating potting material.

30. The method of claim 29, wherein the step of physically aligning is performed by the steps of:

fitting at least two of the plurality of slotted terminal busses and at least two alignment bars into two fixture elements, the two fixture elements maintaining the at least two slotted terminal busses and alignment bars in a substantially fixed position therebetween;

fitting the plurality of electrically conductive plates into a corresponding plurality of slots on the at least two alignment bars;

fitting at least one additional alignment bar into the two fixture elements, the at least one additional alignment bar having slots which engage the plurality of electrically conductive plates; and fitting at least one additional slotted terminal bus into the two fixture elements such that the at least one additional slotted terminal bus is in the predetermined alignment position with respect to the electrodes.

31. The method of claim 30, wherein the fixture elements are rotatable, and wherein the step of soldering is performed by soldering the electrodes corresponding to one terminal bus and rotating the assembly to solder additional electrodes.

32. The method of claim 29, wherein the step of physically aligning is performed by fitting the plurality of electrodes into corresponding slots on the plurality of slotted terminal busses, and wherein the step of soldering is performed by bending portions of the electrode extending through the corresponding slots and soldering the electrodes in place.

* * * * *